US012583375B2

(12) United States Patent
Ponnuchamy et al.

(10) Patent No.: US 12,583,375 B2
(45) Date of Patent: Mar. 24, 2026

(54) DUMP BODY AND FRONT WALL RETROFITTABLE HEAT TRANSFER SYSTEM

(71) Applicant: Caterpillar Global Mining Equipment LLC, Denison, TX (US)

(72) Inventors: Vaitheeswaran Ponnuchamy, Chennai (IN); Daniel Raymond Hettinger, Monticello, IL (US); Christopher Lynn Wylin, Tucson, AZ (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 437 days.

(21) Appl. No.: 18/202,793

(22) Filed: May 26, 2023

(65) Prior Publication Data

US 2024/0391374 A1     Nov. 28, 2024

(51) Int. Cl.
  *B60P 1/28*      (2006.01)
  *B60H 1/00*      (2006.01)
  *B60K 13/04*     (2006.01)
(52) U.S. Cl.
  CPC .......... *B60P 1/286* (2013.01); *B60H 1/00014* (2013.01); *B60K 13/04* (2013.01)
(58) Field of Classification Search
  CPC ..... B60P 1/286; B60H 1/00014; B60K 13/04; B60K 13/06
  See application file for complete search history.

(56)         References Cited

U.S. PATENT DOCUMENTS 8,721,006 B2    5/2014  Uranaka
9,434,231 B2    9/2016  Hagenbuch
2012/0169109 A1  7/2012  Rivera et al.
         (Continued)

FOREIGN PATENT DOCUMENTS

WO     2020005480 A1    1/2020

OTHER PUBLICATIONS

Written Opinion and International Search Report for Int'l. Patent Appln. No. PCT/US2024/024848, mailed Jul. 25, 2024 (10 pgs).

*Primary Examiner* — Daniel J Colilla

(57)         ABSTRACT

A dump body configured to be retrofitted with a front wall exhaust heating system, the dump body having a first horizontally extending heating conduit on the front face of a front wall; one or more longitudinal body support members extending along a bottom face of a bottom floor and across a transition from the bottom floor to a front wall. Each of the one or more longitudinal body support members having an opening extending through the longitudinal body support member to provide for the fitting of horizontal channel sections for a second horizontally extending heating conduit of a front wall exhaust heating system. The dump body also including a first vertically extending heating conduit having a first channel member at a junction of an interior face of the front wall and an interior face of a first one of the pair of opposing side walls; and a second vertically extending heating conduit having a second channel member at a junction of an interior face of the front wall an interior face of a second one of the pair of opposing side walls. The second vertically extending heating conduit being in fluid communication with the first horizontally extending heating conduit via an opening in the front wall.

18 Claims, 6 Drawing Sheets

(56)  References Cited

U.S. PATENT DOCUMENTS

| 2013/0187435 | A1 | 7/2013 | Uranaka | |
| 2014/0159465 | A1 | 6/2014 | Hagenbuch | |
| 2015/0001910 | A1 | 1/2015 | Natarajan et al. | |
| 2019/0389272 | A1* | 12/2019 | Kesani | B60H 1/00014 |
| 2021/0122232 | A1 | 4/2021 | Bromenshenkel et al. | |
| 2021/0122279 | A1 | 4/2021 | Bromenshenkel et al. | |
| 2021/0122280 | A1* | 4/2021 | Morge | B60P 1/28 |
| 2022/0355660 | A1 | 11/2022 | Reynolds et al. | |
| 2024/0355155 | A1* | 10/2024 | Oka | B60P 1/28 |

* cited by examiner

DUMP BODY AND FRONT WALL RETROFITTABLE HEAT TRANSFER SYSTEM

TECHNICAL FIELD

The present disclosure relates to dump body front wall heating channel retrofittable arrangements, and systems, components, and methods thereof.

BACKGROUND

Conventionally, a rear-haul truck may use exhaust gas from its combustion engine to heat internal surfaces of the dump body thereof. The exhaust gas may be routed through the structure of the dump body to heat interior surfaces of the dump body where material carried within the dump body may, at times, freeze in normal operation. Such routing of exhaust gas may enter the front of the dump body and exit elsewhere from the dump body. However, such heating is not needed in some applications.

U.S. Patent App. Pub. No. 2021/0122232 ("the '232 publication") describes a system and method for heating a dump body. The '232 publication describes a heating channel for a front wall of a dump body. The heating channel includes an exhaust inlet provided on the front wall; an exhaust outlet provided on the front wall; and a channel body running continuously from the exhaust inlet to the exhaust outlet. The channel body can have at least one horizontally extending portion and at least one vertically extending portion in a front view of the front wall. The exhaust inlet can be configured to receive exhaust gas output from an internal combustion engine, and the exhaust outlet can be configured to output the received exhaust gas to outside the heating channel.

The present disclosure is directed toward overcoming one or more of the problems discovered by the inventors.

SUMMARY OF THE DISCLOSURE

In an embodiment, a dump body configured to be retrofitted with a front wall exhaust heating system, the dump body comprising: a bottom floor; a pair of opposing side walls; a front wall between the opposing sidewalls and extending from the bottom floor; a support structure arrangement extending from a front face of the front wall, the support structure arrangement including a first vertical support structure and a second vertical support structure separated from the first vertical support structure in a width direction of the dump body; a first horizontally extending heating conduit on the front face of the front wall; one or more longitudinal body support members extending along a bottom face of the bottom floor and across a transition from the bottom floor to the front wall, each of the one or more longitudinal body support members having an opening extending through the longitudinal body support member in a direction transverse to a longitudinal axis of the longitudinal body support member to provide for the fitting of horizontal channel sections for a second horizontally extending heating conduit of a front wall exhaust heating system; a first vertically extending heating conduit having a first channel member at a junction of an interior face of the front wall and an interior face of a first one of the pair of opposing side walls; and a second vertically extending heating conduit having a second channel member at a junction of an interior face of the front wall an interior face of a second one of the pair of opposing side walls, the second vertically extending heating conduit being in fluid communication with the first horizontally extending heating conduit via an opening in the front wall.

In an embodiment, a retrofit kit for completing a front wall exhaust heating system for the dump body, the dump body having a first horizontally extending heating conduit on a front face of a front wall of the dump body, a first longitudinal body support member extending along a bottom face of a bottom floor of the dump body and across a transition from the bottom floor to the front face of the front wall, and having an opening extending there through in a direction transverse to a longitudinal axis of the first longitudinal body support member to provide for the fitting of horizontal channel sections for a second horizontally extending heating conduit of a front wall exhaust heating system, a second longitudinal body support member extending along a bottom face of a bottom floor of the dump body and across a transition from the bottom floor to the front face of the front wall, spaced apart from the first longitudinal body support member, and having an opening extending there through in a direction transverse to a longitudinal axis of the second longitudinal body support member to provide for the fitting of horizontal channel sections for the second horizontally extending heating conduit of the front wall exhaust heating system, a first vertically extending heating conduit having a first channel member at a junction of an interior face of the front wall and an interior face of a first one of the pair of opposing side walls, and a second vertically extending heating conduit having a second channel member at a junction of an interior face of the front wall an interior face of a second one of the pair of opposing side walls, the second vertically extending heating conduit being in fluid communication with the first horizontally extending heating conduit via an opening in the front wall, the retrofit kit comprising: a first horizontal channel section having an open top, and having a length to extend from adjacent an edge of the front wall of the dump body, horizontally across the front wall to the opening in the first longitudinal body support member; a second horizontal channel section having an open top, and having a length to extend horizontally from the opening in the first longitudinal body support member, across the front wall to the opening in the second longitudinal body support member; and a third horizontal channel section having an open top, and having a length to extend from the opening in the second longitudinal body support member, horizontally, across the front wall to adjacent an opposite edge of the front wall.

In an embodiment, a dump body with a heated front wall comprising: a bottom floor; a first side wall and a second side wall opposite the first side wall; a front wall extending between the first side wall and the second side wall and extending from the bottom floor; a support structure arrangement extending from a front face of the front wall, the support structure arrangement including a first vertical support structure and a second vertical support structure separated from the first vertical support structure in a width direction of the dump body; a first horizontally extending heating conduit on the front face of the front wall extending through the first vertical support structure and the second vertical support structure; a first longitudinal body support member extending along a bottom face of the bottom floor of the dump body and across a transition from the bottom floor to the front face of the front wall, and having a first transverse opening extending there through in a direction transverse to a longitudinal axis of the first longitudinal body support member; a second longitudinal body support member extending along a bottom face of the bottom floor of the dump body and across a transition from the bottom floor to the front face of the front wall, spaced apart from the first longitudinal body support member, and having a second transverse opening extending there through in a direction transverse to a longitudinal axis of the second longitudinal body support member; a first vertically extending heating conduit having a first channel member at a junction of an interior face of the front wall and an interior face of the first side walls; a second vertically extending heating conduit having a second channel member at a junction of an interior face of the front wall an interior face of the second side wall, the second vertically extending heating conduit being in fluid communication with the first horizontally extending heating conduit via a first opening in the front wall; a second horizontally extending heating conduit comprising a first horizontal channel section extending from adjacent an edge of the front wall proximate the first side wall of the dump body, horizontally across the front face of the front wall to the first transverse opening in the first longitudinal body support member and being in fluid communication with the first vertically extending heating conduit via a second opening in the front wall, a second horizontal channel section extending horizontally from the first transverse opening in the first longitudinal body support member, across the front face of the front wall to the second transverse opening in the second longitudinal body support member, and a third horizontal channel section extending from the second transverse opening in the second longitudinal body support, horizontally, across the front face of the front wall to adjacent an opposite edge of the front wall proximate the second side wall and being in fluid communication with the second vertically extending heating conduit via a third opening in the front wall.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
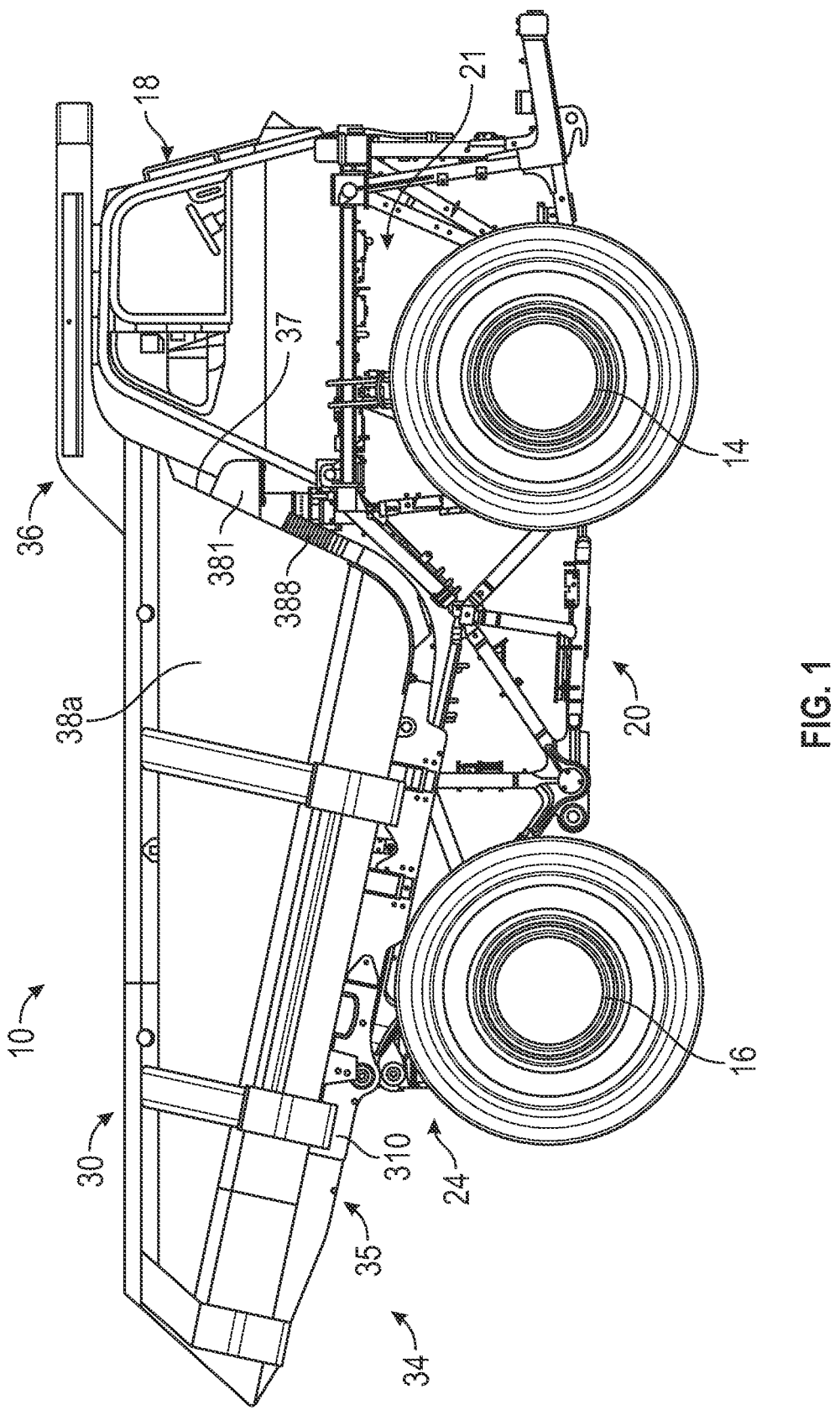
FIG. 1 is a side view of a machine according to embodiments of the disclosed subject matter.

Referring now to the drawings and with specific reference to FIG. 1, this figure illustrates an exemplary embodiment of a machine 10. Machine 10 may be a mobile machine that performs some type of operation associated with an industry such as mining, construction, or any other industry known in the art. For example, as shown in FIG. 1, machine 10 may be an earth moving machine, particularly, an off-highway rear haul dumping truck 10.

Machine 10 may have a space frame 20 supported by front wheels 14 and rear wheels 16 (including respective tires). The front and rear wheels 14, 16 may be connected to space frame 20 by front suspension members and rear suspension systems, respectively. Machine 10 may also include a bed or body 30 supported by space frame 20. Such bed or body 30 may be referred to herein as a dump body 30. The dump body 30 can be configured as a receptacle to receive hauling material.

A rear portion 34 of the dump body 30 can be pivotably coupled or attached to a portion (including portions) at a rear 24 of the space frame 20. Portions of the dump body 30 between the rear portion 34 and a front portion 36 of the dump body 30 can be movably positioned relative to respective portions of the space frame 20 to support the dump body 30 on the space frame 20 at a rest position of the dump body 30. The rest position of the dump body 30 may be considered as positioning of the dump body 30 such that the front portion 36 of the dump body 30 is at a lower-most position (i.e., not raised). The dump body 30 can be pivoted at the rear portion 34 about the rear 24 of the space frame 20 to raise or lower the portion of the dump body 30 in front of the pivot (and hence move the portion of the dump body 30 behind the pivot in the opposite direction). Such pivoting of the dump body 30 to raise the front portion 36 of the dump body 30 can be to dump content from within the dump body 30. Likewise, pivoting of the dump body 30 to lower the front portion 36 of the dump body 30 to the rest position can be to receive content in the dump body 30.

Machine 10 may have an operator cabin 18 supported by the space frame 20. Machine 10 may also be equipped with a steering mechanism and controls to move the machine 10 and controls to raise and lower dump body 30. The steering mechanism and the controls may be located within the operator cabin 18 of the machine 10.

Machine 10 may have a prime mover (not expressly shown) supported by the space frame 20. Generally, the prime mover may be provided in a space 21 of the space frame 20. The prime mover may be configured to propel the front and rear wheels 14, 16 in the forward or rearward direction. The prime mover may be lengthwise aligned on space frame 20 along a travel direction of the machine 10. One skilled in the art will recognize, however, that the prime mover may be aligned transversally. In one exemplary embodiment, the prime mover may be an internal combustion engine, which may be a two-stroke or four-stroke diesel engine, for instance. One skilled in the art will recognize, however, that the prime mover may be any other type of internal combustion engine, such as a gasoline engine or a gaseous fuel-powered engine. The prime mover may be connected to front and/or rear wheels 14, 16 via other components such as a drive train (not shown) to transfer motive power to move the front and/or rear wheels 14, 16 in a forward or rearward direction.

In general, a space frame according to embodiments of the disclosed subject matter, such as space frame 20, may be a frame that includes structural members connected to each other at nodes and/or joints. The structural members can include hollow tubes and/or solid tubes, and in some instances can be connected according to a triangulated structural. The structural members can be made of metal, metal alloys, or reinforced composite materials, for instance. Elongate support members, according to embodiments of the disclosed subject matter, can be in the form of rods and/or tubes, circular, for instance, where some or all of the rods and/or tubes may be solid or hollow.

Figure 2:
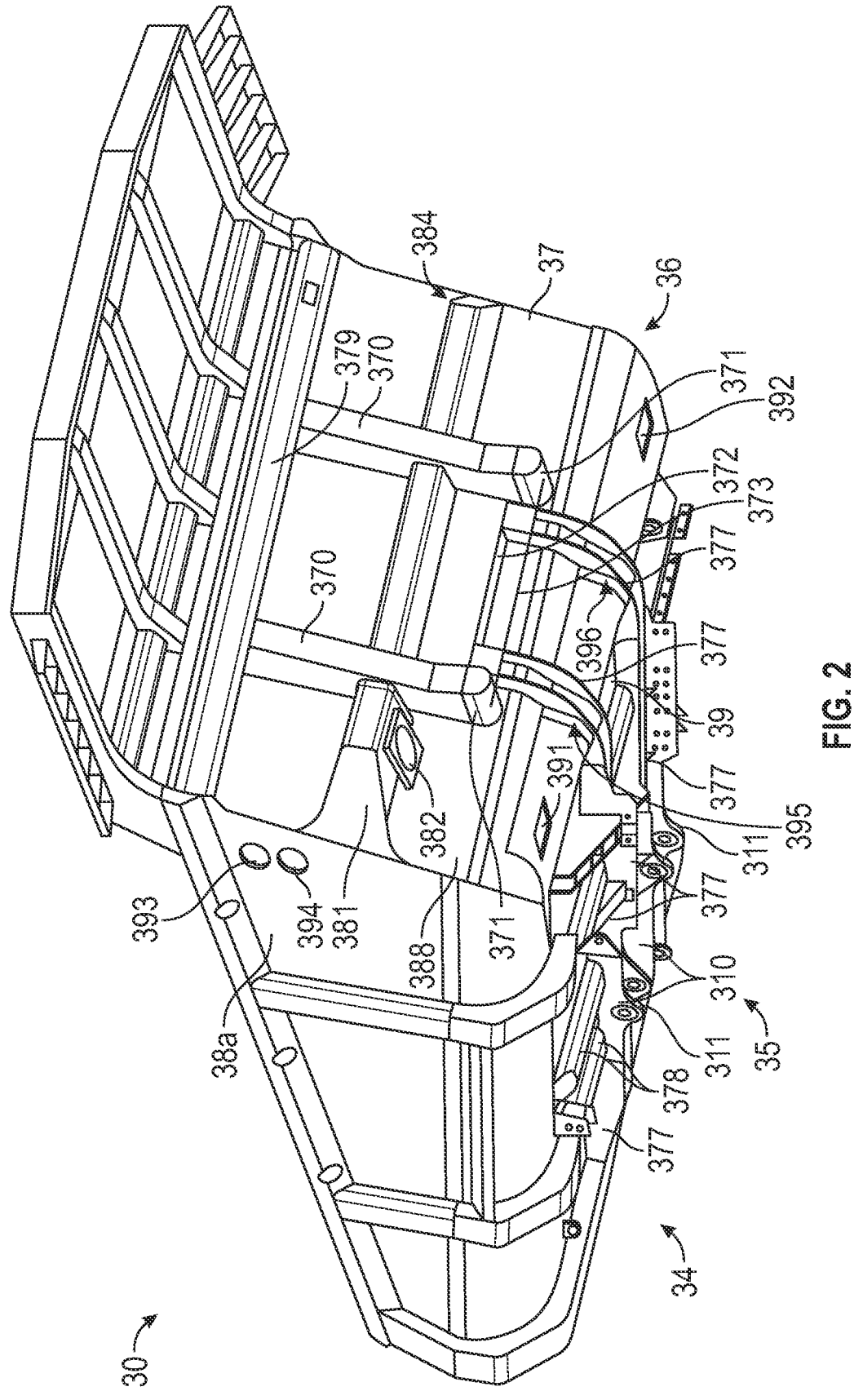
FIG. 2 is a front, side perspective view of a dump body according to embodiments of the disclosed subject matter.

Turning now to FIG. 2, the dump body 30 can have, on a bottom 35 thereof, a rear pivot support 310, and on a front wall 37 thereof, a pair of vertical support structures 370 of a support structure arrangement. Optionally, a loading plate 373 may be provided between portions of the vertical support structures 370, for manufacturing purposes, for instance.

The rear pivot support 310 can be provided at the rear portion 34 of the dump body 30, such as shown in FIG. 2. The rear pivot support 310 can have a pair of rear pivots 311. The rear pivots 311 can be spaced apart from each other in a width or lateral direction of the dump body 30, such as shown in FIG. 2.

The rear pivot support 310 can be fixedly coupled to the bottom 35 of the dump body 30. For example, the rear pivot support 310 can be welded to the bottom 35 of the dump body 30. More specifically, according to one or more embodiments of the disclosed subject matter, each rear pivot 311 can be welded to a corresponding longitudinal body support member 377 on the bottom of the dump body 30 and extending across the transition from the bottom 35 to the front wall 37. As shown in FIG. 2, for instance, each rear pivot 311 can be welded in-line with the corresponding 377. Thus, the rear pivot 311 can be considered as part of the longitudinal body support member 377 (i.e., integral and/or one-piece with). Additionally, transverse body support members 378 can be received in cut-outs of the rear pivots 311.

A support structure arrangement can be provided (e.g., fixedly mounted) on the front face of the front wall 37 of the dump body 30, where the front wall 37 is between opposing sidewalls 38a and 38b (only 38a can be seen in the figure) of the dump body 30 and extends from one end of a bottom floor 39 at the bottom 35 of the dump body 30. The support structure arrangement can be comprised of a pair of vertical support structures 370 fixed to the front face of the front wall 37, for instance, via welding. The vertical support structures 370 can be spaced apart from each other in the width direction of the dump body 30. According to one or more embodiments, the vertical support structures 370 can be centered on opposite sides of a vertical centerline of the dump body 30 in a front view of the dump body 30.

Optionally, the vertical support structures 370 can be hollow elongate support members. According to one or more embodiments, each of the vertical support structures 370 can be formed of shaped sheet metal, for instance, different pieces of shaped sheet metal. Thus, according to one or more embodiments, the vertical support structures 370 may be comprised of a plurality of vertical support structure sections. Optionally, a loading plate 372 may be provided between portions of the vertical support structures 370, for instance, for manufacturing purposes (i.e., placement of the bottom portions of the vertical support structures 370 forming down-facing contact surfaces 371).

Vertical support structures 370 can be vertical in at least the front view of the dump body 30. Depending upon the configuration of the front wall 37 of the dump body 30, in a side view of the dump body 30 the vertical support structures 370 may be generally vertical, for instance, at an angle 20 degrees or less from vertical. According to one or more embodiments, in the side view of the dump body 30 some surfaces may be at one vertical angle and other surfaces may be at another vertical angle. For instance, an upper front surface portion of the vertical support structure 370 may be at an angle 20 degrees from vertical and a lower front surface portion, which may include the bottom portion forming the down-facing contact surfaces 371, can be at or about vertical.

The bottom portions of the vertical support structures 370, as noted above, can form down-facing contact surfaces 371. According to one or more embodiments, the down-facing contact surface 371 can be convex, for instance, semi-cylindrical, such as shown in FIG. 2, or elliptical or multi-planar. The down-facing contact surfaces 371 of the vertical support structures 370 can be the same configuration. The down-facing contact surfaces 371 can be configured to be received or seated in upward-facing contact surfaces of support rockers coupled to the space frame 20.

According to one or more embodiments, the vertical support structures 370 may be thicker (i.e., extend more from the front wall 37) at a bottom portion as compared to a top portion. That is, the vertical support structure 370 can taper from thick to thin from the bottom portion to the top portion, which may, according to one or more embodiments, reach a top transverse body support member 379.

According to one or more embodiments, one or more longitudinal body support members 377 can extend from the bottom floor 39 to the front wall 37 (i.e., transition from horizontal to vertical/substantially vertical). As shown in FIG. 2, for instance, two longitudinal body support members 377 can extend along the front wall 37 such that ends thereof are provided between the vertical support structures 370. An inner support may be provided at internal corners of the dump body 30 between the sidewalls 38 (38a and 38b collectively referenced as 38) and a rear face of the front wall 37. The inner supports can provide protective interfaces between the side-walls 38 and the front wall 37 to transfer stresses from an actual interface between the sidewalls 38 and the front wall 37. The inner supports can also prevent the internal corners at the interface between the sidewalls 38 and the front wall 37 from being relatively sharp, which may otherwise allow hauling material in the dump body to coalesce at the relatively sharp internal corners.

A first horizontally extending heating conduit 384 can be provided on the front face of the front wall 37. In an embodiment, the first horizontally extending heating conduit 384 can be installed as part of the manufacturing of the dump body 30. The first horizontally extending heating conduit 384, which can be a hollow conduit, can extend from the front face of the front wall 37. Moreover, the first horizontally extending heating conduit 384 can be fixedly coupled (e.g., welded) to the front face of the front wall 37 and extend through the vertical support structures 370. As shown in FIG. 2, the first horizontally extending heating conduit 384 may be the only heating channel on the front face of the front wall 37. Optionally, the first horizontally extending heating conduit 384 may be defined, in part, by the front face of the front wall 37. That is, the front face of the front wall 37 may form a back wall of the first horizontally extending heating conduit 384.

The first horizontally extending heating conduit 384 can have an exhaust inlet 381 which includes an exhaust inlet port 382 providing an inlet into the exhaust inlet 381. Alternatively, exhaust inlet 381 and/or exhaust inlet port 382 can be installed as part of a retrofit.

When the dump body 30 is being retrofitted for front wall exhaust heating, in an embodiment holes or openings 391 and 392 are created in the front wall 37. Additionally, one or more (two are shown) exhaust holes or openings 393 and 394 are created in the side wall 38 for exhaust vents.

Further, first narrow horizontal channel 395 and second narrow horizontal channel 396 each extend through their respective longitudinal body support member 377 in a direction transverse to a longitudinal axis of the longitudinal body support members 377. The first narrow horizontal channel 395 and the second narrow horizontal channel 396 are preferably created during manufacture. The first and second narrow horizontal channels 395 and 396 are to allow the three horizontal channel sections 401, 403 and 405 (see FIG. 3) to be fitted during the retrofit process. Alternatively, they can be installed as part of the manufacturing of the dump body. The first and second narrow horizontal channels 395 and 396 are each preferably a narrow section of material like a narrow slice of one of the three horizontal channel sections 401, 403 and 405. Each of the first and second narrow horizontal channels 395 and 396 are attached (e.g., welded) to a corresponding opening in the corresponding longitudinal axis of the longitudinal body support members 377.

Figure 3:
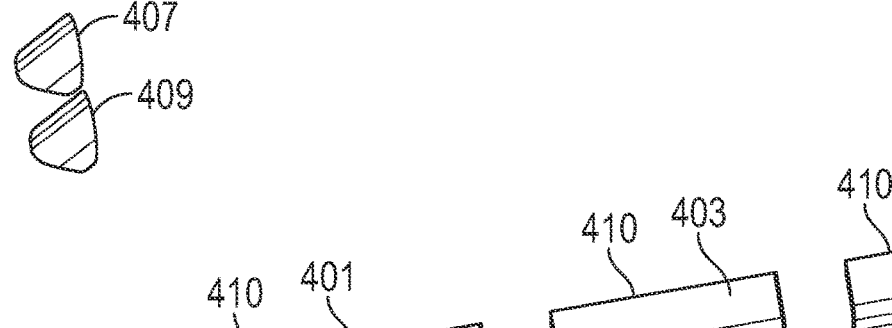
FIG. 3 shows the retrofit components of a retrofit kit.

Turning now to FIG. 3, the parts used to convert the dump body 30 shown in FIG. 2 into a dump body with a heated front wall are shown. Three horizontal channel sections 401, 403 and 405 are shown. Those channel sections generally have a curved or "C" cross-section with an open top. Each of the three horizontal channel sections 401, 403 and 405 have pairs of upper surfaces 410 (only one of each pair is visible in FIG. 3) for mating with the curved portion of the dump body 30. The first horizontal channel section 401 can extend from adjacent an edge of the front wall 37, horizontally across the front wall 37 to first narrow horizontal channel 395 in the first longitudinal body support member 377. The first horizontal channel section 401 has a closed end 411 located at the end adjacent the edge of the front wall 37 when the first horizontal channel section 401 is in place on the dump body 30. The closed end 411 can be, for example, a metal plate welded to the end of the first horizontal channel section 401. The second horizontal channel section 403 can extend horizontally across the front wall 37 from first narrow horizontal channel 395, opposite first horizontal channel section 401, to second narrow horizontal channel 396. The third horizontal channel section 405 can extend horizontally across the front wall 37 from second narrow horizontal channel 396, opposite second horizontal channel section 403, to adjacent an opposite edge of the front wall 37. The third horizontal channel section 405 has a closed end 412 located at the end adjacent the opposite edge of the front wall 37 when the third horizontal channel section 405 is in place on the dump body 30. The closed end 412 can be, for example, a metal plate welded to the end of the third horizontal channel section 401.

Figure 4:
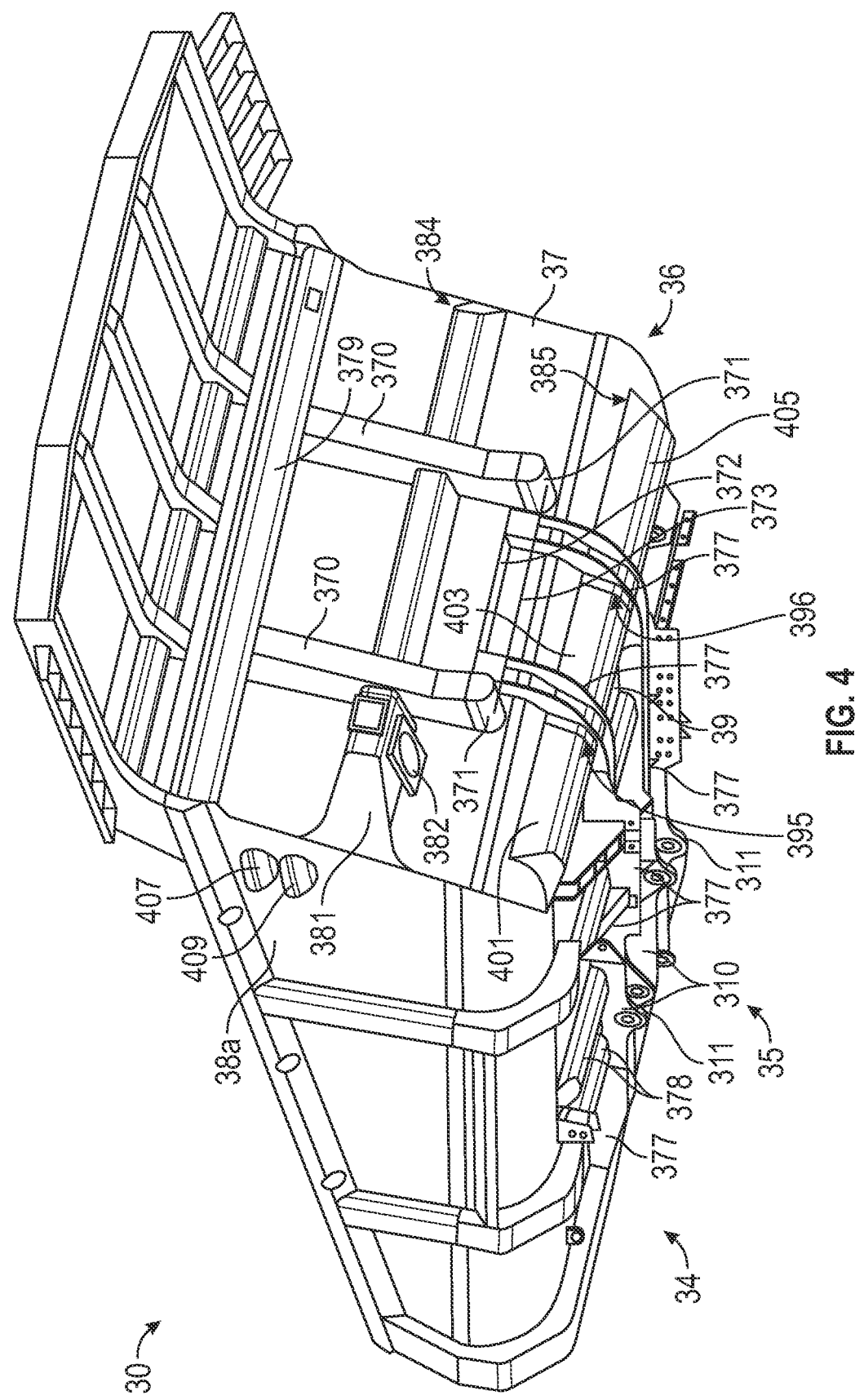
FIG. 4 is a front, side perspective view of the dump body of FIG. 2 retrofitted for front wall heating.

During the retrofit procedure, the three horizontal channel sections 401, 403 and 405 are used to form the second (lower) horizontally extending heating conduit 385 (shown in FIG. 4.).

One or more (two are shown) exhaust outlets 407 and 409 are shown. During the retrofit procedure, they are attached, for example by welding, over openings 391 and 392 shown in FIG. 2.

Turning now to FIG. 4, a front, side perspective view of the dump body of FIG. 2 retrofitted for front wall heating is shown. The first horizontally extending heating conduit 384 can have an exhaust inlet 381. The first horizontally extending heating conduit 384 can run continuously from the exhaust inlet 381 horizontally to the opposite side of the front wall 37. The exhaust inlet 381 may be provided on the front face of the front wall 37 below (in elevation) the exhaust outlets 407 and 409.

FIG. 4, shows, for instance, a first horizontally extending heating conduit 384 and the second horizontally extending heating conduit 385. In an embodiment, the second horizontally extending heating conduit 385 is located below (closer to the bottom floor than) the first horizontally extending heating conduit 384. Additionally, the first horizontally extending heating conduit 384 and the second horizontally extending heating conduit 385 can be parallel to each other or substantially (+ or −10 degrees) parallel to each other. Each of the first horizontally extending heating conduit 384 and the second horizontally extending heating conduit 385 can be comprised of a plurality of horizontally extending sections or segments. According to one or more embodiments, the second horizontally extending heating conduit 385 is formed during the retrofit procedure from the three horizontal channel sections 401, 403 and 405 and the first and second narrow horizontal channels 395 and 396. The second horizontally extending heating conduit 385 can run along the lower curved portion of the front wall 37 adjacent to the bottom floor 39. The second horizontally extending heating conduit 385 can extend from one edge of the front wall, adjacent the first side wall 38a to another edge of the front wall, adjacent the second side wall 38b and enclose openings 391 and 392 (shown in FIG. 2). The second horizontally extending heating conduit 385 may extend between first and second narrow horizontal channels 395 and 396 forming a channel between and through each of the two longitudinal body support members 377.

Figure 6:
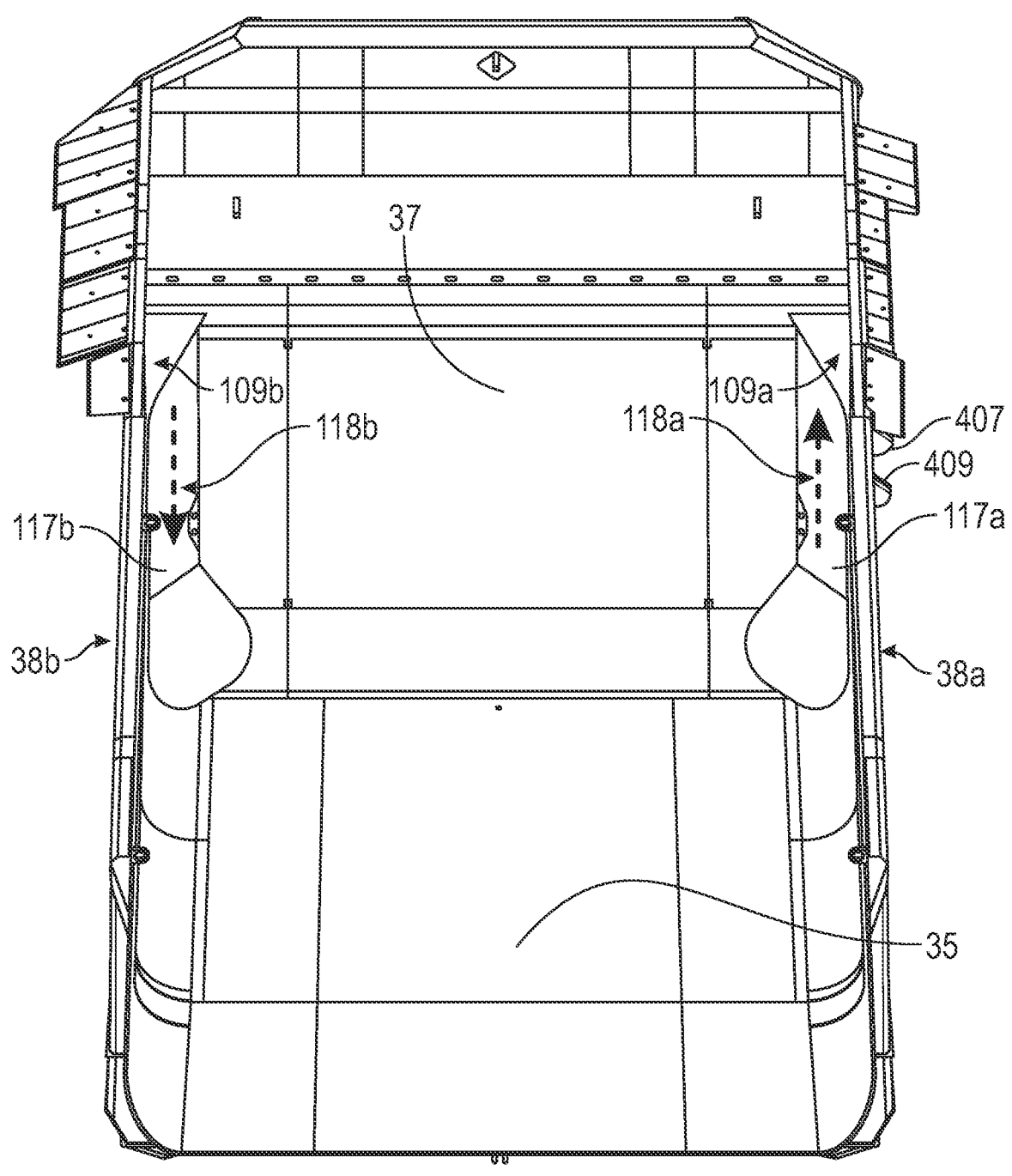
FIG. 6 is a plan view of the interior of the dump body of FIG. 4 with arrows indicating the direction of flow of exhaust gas.

Turning to FIG. 6 which is a plan view of the interior of the dump body of FIG. 4, The front wall 37 intersects the pair of side walls 38a and 38b, respectively, at junctions 109a and 109b which are connecting junctions of front wall 37 and the two side wall 38a and 38b. Extending along the entire length of each of the junctions are generally flat or concave vertical channel members 117a and 117b (also referred to as first and second vertically extending heating conduits, respectively) which define generally contoured surfaces. The contoured surfaces of the junctions can be shaped to usher evacuation of material when the dump body 30 is raised and eliminates material from accumulating in pockets at the junctions.

Further, passages or channels 118a and 118b are formed between each of the channel members 117a and 117b the respective junctions of the front wall 37 and the side walls 38a and 38b of the dump body 30 (also referred to as first and second vertically extending heating conduits 118a and 118b, respectively). Openings 391 and 392 through the front wall 37 provide fluid communication between first and second vertically extending heating conduits 118a and 118b, respectively, and the ends, or proximate the ends, of second horizontally extending heating conduit 385. Channel member 117b is also in fluid communication with first horizontally extending heating conduit 384 via opening 397 (shown in FIG. 5). Further, channel member 117a is also in fluid communication with exhaust openings 393 and 394 in side wall 38a.

In the context of the vertically and horizontally extending heating conduits, horizontal and vertical can be defined in terms of the front view of the dump body 30, where in a side view of the dump body 30 vertically extending heating conduits 118a and 118b may extend according to an angle of the front wall 37. Thus, in the side view the vertically extending heating conduits 118a and 118b may extend substantially vertically, for instance, 20 degrees or less from vertical. Alternatively, they can be more than 20 degrees from vertical. Each of the horizontally extending heating conduits and the vertically extending heating conduits may have a channel width greater than a channel height (e.g., generally rectangular in cross-section).

Turning back to FIG. 4, according to one or more embodiments, the heating conduits can traverse a top portion and a bottom portion of the front face of the front wall 37, such as shown in FIG. 4. For example, the heating conduits may extend or run continuously from the exhaust inlet 381 via the first horizontally extending heating conduit 384, to the first vertically extending heating conduit 118a, to the second horizontally extending heating conduit 385, to the second vertically extending heating conduit 118b, to the exhaust outlets 409 and 407.

The exhaust inlet 381 may be oriented such that one or more openings thereof can be downward, for instance, directly downward (i.e., vertically) or at a slight angle from vertical (e.g., 5 degrees or less). Thus, the exhaust inlet 381 may, according to embodiments of the disclosed subject matter, be termed a down-facing exhaust inlet. The exhaust inlet 381 may be coupled to an exhaust bellows system (not shown) that couples an exhaust system of the machine 10, particularly an exhaust outlet, to the exhaust inlet 381 via the exhaust inlet port 382. Generally, exhaust from the prime mover (e.g., internal combustion engine) of the machine 10 can be output, via the exhaust outlet, and provided to the exhaust inlet 381, for instance, via the exhaust bellows system.

Figure 5:
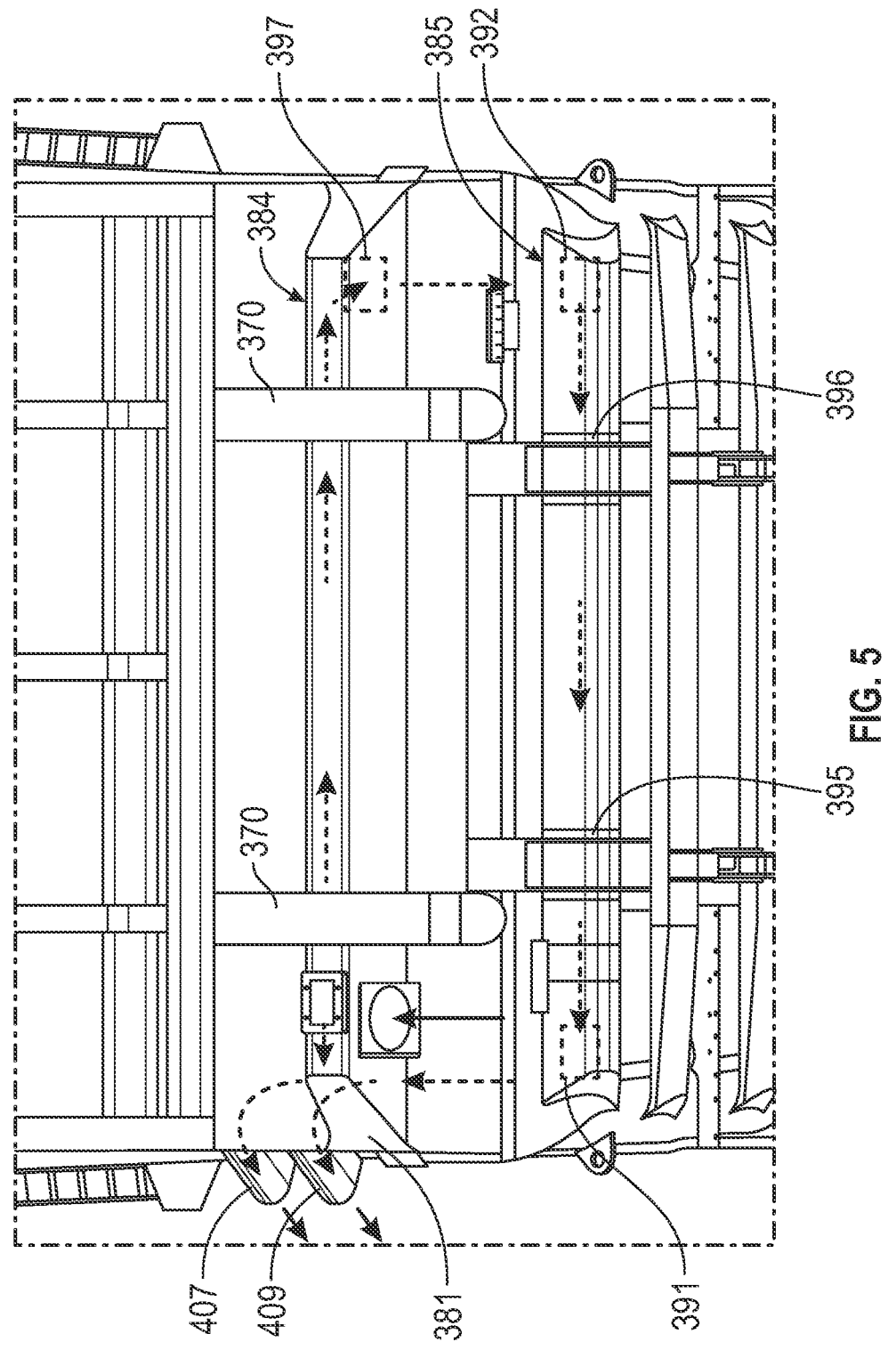
FIG. 5 shows the exterior of the front wall of the dump body of FIG. 4 with arrows indicating the direction of flow of exhaust gas.

The exhaust outlets 407 and 409 may be oriented such that one or more outlet openings thereof can face outward. For instance, FIG. 4 and FIG. 5 show the outlet opening of the exhaust outlets 407 and 409 facing outward in the width direction of the dump body 30, away from the front wall 37 of the dump body 30.

INDUSTRIAL APPLICABILITY

As noted above, embodiments of the present disclosure relate to a dump body that can be retro fitted to have a front wall heating arrangement, and systems, components, and methods thereof.

With reference to FIGS. 2 and 3, the dump body 30 can be manufactured without a complete front wall heating assembly. For example, the exhausts outlets 407 and 409 and the three horizontal channel sections 401, 403 and 405 can be omitted to save manufacturing time and to decrease the weight of the dump body 30. To retrofit the dump body 30 to include a complete heated front wall heating assembly openings 391, in certain embodiment holes or openings 391 and 392 are created in the front wall 37. Additionally, one or more (two are shown) exhaust holes or openings 393 and 394 are created in the side wall 38 for exhaust vents. Alternatively, one or more or all of the openings can be made during the original manufacturing process. Exhaust outlets 407 and 409 are then welded, or similarly attached, to the perimeter of openings 393 and 394, respectively. The three horizontal channel sections 401, 403 and 405 are welded to the dump body 30 along their pairs of upper surfaces 410 to form a channel with the first and second narrow horizontal channels 395 and 396, to which they are also welded. The front wall 37 forming the other wall of the channel, thereby creating the second horizontally extending heating conduit 385. The location of the channel sections is shown in FIG. 4.

With reference to FIGS. 5 and 6, after the retrofit is completed, generally, exhaust from the prime mover (e.g., internal combustion engine) of the machine 10 can be output, via an exhaust outlet thereof, and provided to the exhaust inlet 381, for instance, via an exhaust bellows system. The exhaust flows through first horizontally extending heating conduit 384 and into second vertically extending heating conduit 118b via opening 397 as indicated by the arrows with dashed bodies in FIG. 5. The exhaust then flows through (downward) second vertically extending heating conduit 118b and into second horizontally extending heating conduit 385 via opening 392 as indicated by the dashed arrows in FIGS. 5 and 6. Next, the exhaust flows through second horizontally extending heating conduit 385 and into first vertically extending heating conduit 118a via opening 391 as indicated by the arrows in FIG. 5. The exhaust then flows through (upward) first vertically extending heating conduit 118a and exits the front wall heating system via exhaust outlets 407 and 409 to the external environment as indicated by the arrows in FIGS. 5 and 6. The various described elements that contain the flow of gas from the exhaust inlet 381 to the exhaust outlets 407 and 409 can be referred to as the heating channel.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all stated problems or those that have any or all of the stated benefits and advantages.

The preceding detailed description is merely exemplary in nature and is not intended to limit the invention or the application and uses of the invention. Furthermore, there is no intention to be bound by any theory presented in any preceding section. It is also understood that the illustrations may include exaggerated dimensions and graphical representation to better illustrate the referenced items shown and are not considered limiting unless expressly stated as such.

What is claimed is:

1. A dump body configured to be retrofitted with a front wall exhaust heating system, the dump body comprising:
    a bottom floor;
    a pair of opposing side walls;
    a front wall between the opposing sidewalls and extending from the bottom floor;
    a support structure arrangement extending from a front face of the front wall, the support structure arrangement including a first vertical support structure and a second vertical support structure separated from the first vertical support structure in a width direction of the dump body;
    a first horizontally extending heating conduit on the front face of the front wall;
    one or more longitudinal body support members extending along a bottom face of the bottom floor and across a transition from the bottom floor to the front wall, each of the one or more longitudinal body support members having an opening extending through the longitudinal body support member in a direction transverse to a longitudinal axis of the longitudinal body support member to provide for the fitting of horizontal channel sections for a second horizontally extending heating conduit of a front wall exhaust heating system;
    a first vertically extending heating conduit having a first channel member at a junction of an interior face of the front wall and an interior face of a first one of the pair of opposing side walls; and
    a second vertically extending heating conduit having a second channel member at a junction of the interior face of the front wall and an interior face of a second one of the pair of opposing side walls, the second vertically extending heating conduit being in fluid communication with the first horizontally extending heating conduit via an opening in the front wall.

2. The dump body of claim 1, wherein the first horizontally extending heating conduit includes an exhaust inlet at one end and extends from the exhaust inlet across the front face of the front wall to the opening through the front wall.

3. The dump body of claim 1, wherein the first horizontally extending heating conduit extends through each of the vertical support structures.

4. A retrofit kit for completing a front wall exhaust heating system for the dump body, the dump body having a first horizontally extending heating conduit on a front face of a front wall of the dump body, a first longitudinal body support member extending along a bottom face of a bottom floor of the dump body and across a transition from the bottom floor to the front face of the front wall, and having an opening extending there through in a direction transverse to a longitudinal axis of the first longitudinal body support member to provide for the fitting of horizontal channel sections for a second horizontally extending heating conduit of a front wall exhaust heating system, a second longitudinal body support member extending along the bottom face of the bottom floor of the dump body and across the transition from the bottom floor to the front face of the front wall, spaced apart from the first longitudinal body support member, and having an opening extending there through in a direction transverse to a longitudinal axis of the second longitudinal body support member to provide for the fitting of horizontal channel sections for the second horizontally extending heating conduit of the front wall exhaust heating system, a first vertically extending heating conduit having a first channel member at a junction of an interior face of the front wall and an interior face of a first one of a pair of opposing side walls, and a second vertically extending heating conduit having a second channel member at a junction of the interior face of the front wall and an interior face of a second one of the pair of opposing side walls, the second vertically extending heating conduit being in fluid communication with the first horizontally extending heating conduit via an opening in the front wall, the retrofit kit comprising:

a first horizontal channel section having an open top, and having a length to extend from adjacent an edge of the front wall of the dump body, horizontally across the front wall to the opening in the first longitudinal body support member;

a second horizontal channel section having an open top, and having a length to extend horizontally from the opening in the first longitudinal body support member, across the front wall to the opening in the second longitudinal body support member; and a third horizontal channel section having an open top, and having a length to extend from the opening in the second longitudinal body support, horizontally, across the front wall to adjacent an opposite edge of the front wall.

5. The retrofit kit of claim 4 further comprising one or more exhaust outlets.

6. The retrofit kit of claim 4 wherein the first, second and third horizontal channel sections have a "C" shaped cross section.

7. The retrofit kit of claim 4 wherein the first, second and third horizontal channel sections each have a pair of upper surfaces for mating with the dump body for welding into place.

8. The retrofit kit of claim 7 wherein the first and third horizontal channel sections each have a closed end.

9. The retrofit kit of claim 8 wherein each of the closed ends of the first and third horizontal channel sections comprises a metal plate welded over an open end of the respective horizontal channel section.

10. A dump body with a heated front wall comprising:

a bottom floor;

a first side wall and a second side wall opposite the first side wall;

a front wall extending between the first side wall and the second side wall and extending from the bottom floor;

a support structure arrangement extending from a front face of the front wall, the support structure arrangement including a first vertical support structure and a second vertical support structure separated from the first vertical support structure in a width direction of the dump body;

a first horizontally extending heating conduit on the front face of the front wall extending through the first vertical support structure and the second vertical support structure;

a first longitudinal body support member extending along a bottom face of the bottom floor of the dump body and across a transition from the bottom floor to the front face of the front wall, and having a first transverse opening extending there through in a direction transverse to a longitudinal axis of the first longitudinal body support member;

a second longitudinal body support member extending along the bottom face of the bottom floor of the dump body and across the transition from the bottom floor to the front face of the front wall, spaced apart from the first longitudinal body support member, and having a second transverse opening extending there through in a direction transverse to a longitudinal axis of the second longitudinal body support member;

a first vertically extending heating conduit having a first channel member at a junction of an interior face of the front wall and an interior face of the first side wall;

a second vertically extending heating conduit having a second channel member at a junction of the interior face of the front wall and an interior face of the second side wall, the second vertically extending heating conduit being in fluid communication with the first horizontally extending heating conduit via a first opening in the front wall;

a second horizontally extending heating conduit comprising a first horizontal channel section extending from adjacent an edge of the front wall proximate the first side wall of the dump body, horizontally across the front face of the front wall to the first transverse opening in the first longitudinal body support member and being in fluid communication with the first vertically extending heating conduit via a second opening in the front wall, a second horizontal channel section extending horizontally from the first transverse opening in the first longitudinal body support member, across the front face of the front wall to the second transverse opening in the second longitudinal body support member, and a third horizontal channel section extending from the second transverse opening in the second longitudinal body support, horizontally, across the front face of the front wall to adjacent an opposite edge of the front wall proximate the second side wall and being in fluid communication with the second vertically extending heating conduit via a third opening in the front wall.

11. The dump body of claim 10 further comprising one or more exhaust outlets in fluid communication with the first vertically extending heating conduit via one or more openings in the first side wall.

12. The dump body of claim 11, wherein the first horizontally extending heating conduit includes an exhaust inlet at an end of the first horizontally extending heating conduit distal to the first opening through the front wall.

13. The dump body of claim 11 wherein the first horizontally extending heating conduit, the second horizontally extending heating conduit, the first vertically extending heating conduit and the second vertically extending heating conduit define a heating channel that runs continuously from the exhaust inlet to the one or more exhaust outlets without branching.

14. The dump body of claim 10 wherein each of the first horizontal channel section, the second horizontal channel section and the third horizontal channel section has a "C" shaped cross section that has been welded to the front face of the front wall.

15. The dump body of claim 10, wherein the first horizontally extending heating conduit is defined, at least in part, by the front face of the front wall.

16. The dump body of claim 10, wherein the second horizontally extending heating conduit is defined, at least in part, by the front face of the front wall.

17. The dump body of claim 10 wherein the second horizontally extending heating conduit is located closer to the bottom floor than the first horizontally extending heating conduit.

18. The dump body of claim 17 wherein the first horizontally extending heating conduit and the second horizontally extending heating conduit are substantially parallel to each other.

\* \* \* \* \*